Oct. 4, 1955    E. H. LAND    2,719,789
PHOTOGRAPHIC APPARATUS AND PRODUCT
Filed June 30, 1951    2 Sheets-Sheet 1

INVENTOR
Edwin H. Land
BY
Brown and Mikulka
ATTORNEYS

United States Patent Office 2,719,789
Patented Oct. 4, 1955

2,719,789

PHOTOGRAPHIC APPARATUS AND PRODUCT

Edwin H. Land, Cambridge, Mass., assignor to Polaroid Corporation, Cambridge, Mass., a corporation of Delaware Application June 30, 1951, Serial No. 234,623

12 Claims. (Cl. 95—9)

This invention relates to photography and more particularly to photographic apparatus, such as a camera, and photographic products usable therewith.

This application is a continuation-in-part of my co-pending application Serial No. 6,841, filed February 7, 1948, for "Photographic Apparatus," now Patent No. 2,563,343.

An object of the present invention is to provide a camera of the above type which is particularly adapted for successively exposing a large number of image-receiving areas of a first photosensitive film and for processing said image-receiving areas by superposing said first film on a second film and by spreading a liquid processing composition between said films.

Another object of the present invention is to provide novel means for feeding said liquid processing composition to portions of first and second films that are about to be superposed, said feeding being responsive to the need for said liquid processing composition.

Still another object of the present invention is to provide novel electrical means for controlling the feeding of liquid processing composition to portions of said first and second films that are about to be superposed.

A further object of the present invention is to provide a film which is adapted to support a mass of electrically conducting processing material, which film is provided with means for enabling the making and breaking of electrical contact between said mass and a means for controlling the weeding of said electrically conducting processing composition to said mass.

A still further object of the present invention is to provide a film having electrically conducting strips which constitute parts of an electrical circuit that controls the feeding of liquid processing composition to said film.

Other objects of the invention will in part be obvious and will in part appear hereinafter.

The invention accordingly comprises the apparatus possessing the construction, combination of elements and arrangement of parts and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
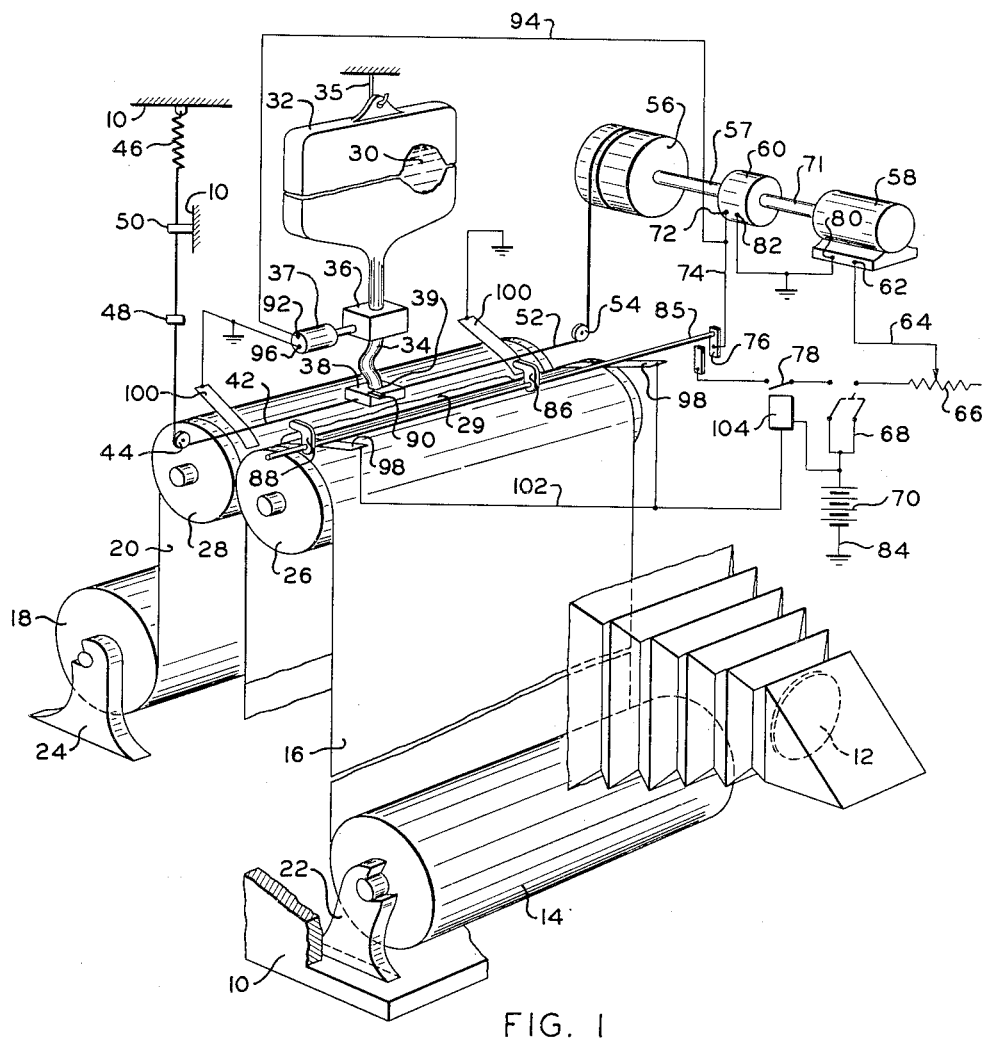
Figure 1 is a diagrammatic, fragmentary, perspective view of one preferred embodiment of the invention.

The camera herein disclosed comprises means for holding a first film of photosensitive material, said first film preferably comprising a base and a silver halide layer, means for exposing an image-receiving area of said first film and means for processing said image-receiving area within the camera, said processing being accomplished by the spreading of a liquid processing composition between said image-receiving area and a second film, also positioned within said camera. Said second film preferably comprises a base and a silver precipitating layer, one species of which includes nuclei of the group consisting of the heavy metal sulfides and the heavy metal selenides. The liquid processing composition may comprise a developer, a silver halide solvent, an alkali, and a viscosity-increasing film-forming material, such as an alkali-inert polymer. Preferably, the liquid processing composition forms a transfer print upon an image-receiving area of said second film, which area corresponds to the image-receiving area of said first film. The exposed surface of the first film and a surface of the second film are provided with a supply of liquid processing composition and said first and second films then are passed between a pair of pressure-applying members to cause superposition of said first and second films and spreading of a thin film of liquid processing composition therebetween. The result of this procedure is to develop the latent image on the image-receiving area of the first film to silver and to form on said image-receiving area a soluble silver complex from unexposed silver halide for transfer to said second film. This complex, at least in part, may be transferred, by imbibition, to the image-receiving area of the second film where it may be developed to silver to provide a positive image.

The photographic process and various species of the first and second films herein referred to are described in detail in my following patent, patent applications and publication: Patent No. 2,543,181, issued on February 27, 1951, for Photographic Product Comprising a Rupturable Container Carrying a Photographic Processing Liquid; application Serial No. 727,385, filed on February 8, 1947, for Photographic Product and Process, now Patent No. 2,698,245; application Serial No. 164,908, filed on May 29, 1950, for Photographic Silver Halide Transfer Product and Process, now abandoned and replaced by application Serial No. 449,995, filed August 16, 1954, and issued as Patent No. 2,698,237 on December 28, 1954; and the article "A new one-step photographic process," published in February 1947 in the Journal of the Optical Society of America, vol. 37, No. 2, pp. 61–77. It is, of course, to be understood that the present invention is not limited to use with first or second films embodying any particular species of chemical composition, the terms "first film" and "second film" being used in their broadest sense to indicate a first film which is photosensitive and a second film which merely may aid in spreading the processing liquid over the surface of the first film or which may, if desired, possess other characteristics.

For the purpose of clarity, the present disclosure omits a description and detailed drawings of some of the camera structure which may be used in conjunction with the embodiments of the present invention herein disclosed. Said camera structure is known to persons skilled in the art and a review of said camera structure is not needed for an understanding of the present invention. Teachings of such camera structure appear in Patent No. 2,435,717, issued to Edwin H. Land on February 10, 1948, for Developing Camera Utilizing a Film, Another Sheet Material, and a Fluid Processing Agent, and Patent No. 2,520,641, issued to Edwin H. Land on August 29, 1950, for Photographic Apparatus.

Referring now to Fig. 1, there is shown a fragmentary, diagrammatic, perspective view of a preferred embodiment of the present invention. The embodiment shown in Fig. 1 is a photocopy camera which is provided with a pair of pressure-applying members of the kind previously referred to. These pressure-applying members provide a pressure region between their adjacent surfaces, which pressure region is adapted to movably receive, in superposed relation, first and second films of the kind previously referred to and to spread between said films a thin layer of liquid processing composition. In operation, said first and second films are adapted to be drawn between said pressure-applying members, portions of said first and second films which are approaching closely to said pressure region being adapted to support a mass of liquid processing composition from which the liquid processing composition spread between said films is supplied. A discharge means is provided for ejecting liquid processing composition from a container into the mass supported by said films. This discharge means is adapted to reciprocate longitudinally of the pressure-applying members, and to eject a succession of thin strips of liquid processing composition. An electrical circuit, including a plurality of brushes positioned adjacent edges of said first and second films, is provided to control the flow of processing liquid composition from said discharge means. The processing liquid composition is electrically conducting and, by making and breaking electrical connection between the aforementioned brushes, controls the flow from the discharge means.

The camera of Fig. 1, as shown, comprises a housing 10 which mounts a lens, shutter assembly and bellows schematically indicated at 12. Rotatably mounted within housing 10 is roll 14 which comprises a first film 16 of photosensitive material that is adapted to be positioned by suitable guide surfaces and exposed in the focal surface of lens 12. First film 16 may comprise a silver halide photosensitive layer. Also mounted within the housing 10 is roll 18 which comprises second film 20 that is preferably adapted to receive a positive visible image which corresponds to the latent negative image formed by exposure of said first film 16. Second film 20 may comprise a silver precipitating layer having precipitating nuclei from the group consisting of the heavy metal sulfides and the heavy metal selenides. Roll 14 is trunnioned on brackets 22 and roll 18 is trunnioned on brackets 24, one bracket 22 and one bracket 24 being shown in Fig. 1.

Pressure-applying members, such as rollers 26 and 28, are suitably mounted in housing 10 and are adapted to exert pressure on opposite sides of first and second films 16, 20 that have been superposed and that are being drawn between said pressure-applying members 26, 28. It is to be expressly understood that the pressure-applying members may comprise elements other than rollers. For example, both of the pressure-applying members may comprise flat or curved plates or, alternatively, one of the pressure-applying members may comprise a plate and the other a roller. Adjacent surfaces of pressure-applying members 26, 28 are spaced apart a distance slightly greater than the combined thickness of said first and second films to provide a pressure region through which said first and second films 16, 20 may be moved in superposed relation with a thin layer of liquid processing composition spread therebetween. First film 16, in operation, extends from roll 14 into the focal surface of lens 12 and into the V-shaped entrance to the pressure region between said pressure-applying members 26, 28. Second film 20 extends from roll 18 and into said V-shaped entrance. Said first and second films thence converge into said pressure region between said pressure-applying members 26, 28. The portions of said first and second films which are positioned in the entrance to the pressure region between said pressure-applying members or, stated in another way, which are approaching closely to said pressure region, are adapted to hold a mass 29 of electrically conducting processing composition 30 from which is supplied the thin layer of liquid processing composition being spread between superposed portions of said films 16, 20 within said pressure region. Pressure-applying members 26, 28 may be suitably driven as by a hand crank or a motor (not shown).

At 32 is indicated a container which is adapted to hold a supply of electrically conducting liquid processing composition 30 and which is secured to housing 10 as by means of hook 35. In order to provide the first and second films with a supply of liquid processing composition that is adapted to be spread evenly between said first and second films, when said films are moving through the pressure region between said pressure-applying members 26, 28, a discharge means such as flexible nozzle 34, which is connected to container 32, is mounted for reciprocal movement longitudinally of said pressure-applying members, said nozzle 34 being adapted to eject a thin strip or layer of liquid processing composition onto portions of said first and second films in the entrance to the pressure region between said pressure-applying members. Liquid processing composition 30 is adapted to flow from container 32 through nozzle 34 to mass 29 of liquid processing material which, as stated above, may be supported on portions of said first and second films that are positioned in the entrance to the pressure region between said pressure-applying members 26, 28. A control means, such as valve 36, which may be electrically actuated as by means of solenoid 37, is operatively connected to nozzle 34 for controlling the flow of liquid through nozzle 34.

The aforementioned reciprocal movement of nozzle 34 is accomplished in the present embodiment by means of block 38, which is adapted to be reciprocated longitudinally of rollers 26, 28. Block 38 removably mounts nozzle 34 by means of a bore 39 which extends through said block 38. When pressure-applying members 26 and 28 are rotating and thereby superposing successive portions of said first and second films therebetween, block 38 and nozzle 34 may be reciprocated lengthwise of the entrance to the pressure region between said pressure-applying members and valve 36 may be adjusted to discharge liquid processing composition 30 when said block is moving in one direction and to prevent discharge when said block is moving in the opposite direction. In this manner, successive strips of processing liquid may be ejected onto portions of said film which are approaching closely to the pressure region between said pressure-applying members 26, 28 and mass 29 of liquid processing composition 30 may be formed.

The speed of movement of block 38, the flow of processing liquid from nozzle 34 and the duration of said flow, in practice, are so adjusted that the amount of liquid processing composition deposited at one stroke of said nozzle is sufficient only to eject a strip of liquid processing composition of predetermined thickness and of a length which is less than the width of said first and second films. The speed of movement of said block 38, the flow of liquid processing composition from nozzle 34 and the duration of said flow are so controlled as to maintain said mass 29 at a predetermined volume.

As viewed in Fig. 1, block 38 is drawn to the left preferably by means of flexible cable 42, which is connected at one of its ends to block 38, is received by pulley 44 and is connected at the other of its ends to spring 46 which, in turn, is connected to housing 10. Secured to cable 42 is lug 48 which cooperates with an adjustable stop 50 to limit leftward movement of block 38.

Block 38, preferably, is drawn to the right by means of flexible cable 52, which is connected at one of its ends to block 38, is received by pulley 54 and is wound at the other of its ends on drum 56. Drum 56 may be intermittently driven and is rotatably mounted on shaft 57 which is connected to motor 58 through magnetic clutch 60. Terminal 62 of motor 58 is connected by lead 64 through variable resistor 66 and double throw switch 68 to power supply 70. Terminal 72 of magnetic clutch 60 is connected by lead 74 through switches 76, 78 and 68 to power supply 70. Terminals 80, 82 and 84 of motor 58, magnetic clutch 60 and power supply 70, respectively, are connected to ground. Switch 68 may be manually thrown to complete the circuit which comprises motor 58, power supply 70 and variable resistor 66. When switch 68 is thus manually thrown, shaft 71 of motor 58 rotates at a speed which may be varied by means of variable resistor 66. When switch 68 is manually closed, switch 78 being in normal closed position and assuming that switch 76 also is closed, magnetic clutch 60 is actuated, drum 56 rotates and block 38 moves to the right.

When block 38 has moved a predetermined distance to the right, the electrical control means is adapted to deenergize clutch 60 and to uncouple shaft 57 from shaft 71, after which time block 38 is drawn to the left by spring 46. Magnetic clutch 60 is deenergized at this point by means of switch 76 which is controlled by slidable switching bar 85 having a pair of adjustable stops 86 and 88 mounted thereon. Stops 86, 88 are adapted to be engaged by lug 90 which is mounted on block 38. In operation, movement of block 38 to the right is interrupted at a predetermined position when lug 90 engages stop 86 to open switch 76 and to deenergize magnetic clutch 60. When clutch 60 is deenergized, block 38 moves to the left, as a result of the contraction of spring 46. At a predetermined left-hand position, lug 90 engages stop 86, as a result of which switching bar 85 slides to the left and switch 76 is closed. When switch 76 is closed, magnetic clutch 60 is actuated, drum 56 rotates and nozzle 34, supported by block 38, again moves to the right.

Flow of processing liquid composition through nozzle 34 is permitted by valve 36 when block 38 is moving to the right and is prevented by valve 36 when block 38 is moving to the left. Solenoid 37, which operates valve 36, is actuated as follows. Terminal 92 of solenoid 37 is connected by lead 94 to terminal 72 of magnetic clutch 60. Terminal 96 of solenoid 37 is connected to ground. When switch 76 is closed and magnetic clutch 60 is energized so that block 38 is moving to the right, solenoid 37 is actuated and valve 36 is opened to permit ejection of a strip of liquid processing composition. When switch 76 is open, after engagement of lug 90 with stop 86 and block 38 is drawn to the left by spring 46, solenoid 37 is deenergized so that valve 36 is closed and the flow of liquid processing composition through nozzle 34 ceases. By varying the speed of motor 58 and consequently the reciprocating speed of nozzle 34, the amount of liquid processing composition ejected into mass 29 may be controlled.

When properly adjusted, the above cycle of operation produces a flow of liquid processing composition sufficient to maintain the mass 29 of liquid processing composition 30 at a predetermined volume, with liquid processing composition 30 being removed from said mass 29 at the same rate that it is being supplied thereto. Greater than a predetermined volume of mass 29 of liquid processing composition 30 may be prevented by means of an electrical circuit which interrupts the normal operation of valve 36 to control the flow of liquid processing composition from nozzle 34 in response to the difference of the volume of the mass 29 of liquid processing composition from the aforementioned predetermined volume. This circuit, in the present embodiment, comprises two pairs of terminals such as brushes, said pairs being positioned at opposite ends of the entrance to the pressure region between the pressure-applying members. Each pair of terminals may comprise a brush 98 which presses against an edge of first film 16 and a brush 100 which presses against an edge of second film 20. Brushes 98 are connected by lead 102 through solenoid 104 to power supply 70. Brushes 100 are connected to ground. When electrical contact is made between either of brushes 98 and either of brushes 100, solenoid 104 is actuated and switch 78 is opened, as a result of which magnetic clutch 60 is deenergized and block 38, no matter what its position, is pulled to the left by means of spring 46. When mass 29 of liquid processing material 30, which, as stated above, is electrically conducting, is greater in volume than a predetermined amount, it tends to overflow towards the edges of portions of the first and second films in the entrance to the pressure region between said pressure-applying members and to make an electrical connection between brushes 98 and 100. Such connection actuates solenoid 104, opens switch 78 and closes valve 36. Thus, if an oversupply of liquid processing composition exists in the entrance to the pressure region between the pressure-applying members, block 38 moves to the left and further flow of liquid processing composition to the mass 29 is prevented.

In the operation of the photocopy camera of Fig. 1, roll 14 is positioned on brackets 22 and roll 18 is positioned on brackets 24. First film 16 is drawn from roll 14 into the focal surface of lens 12 and into contact with pressure-applying member 26. Second film 20 is drawn from roll 18 into contact with pressure-applying member 28. The first and second films thence are superposed between said first and second pressure-applying members and the camera is made lighttight. Exposure of an image-receiving area of first sheet 16 then is made. Superposed first and second films now are drawn between pressure-applying members 26, 28, thus moving said exposed image-receiving area of first film 16 from exposure position into superposition with second film 20. Coincidentally with the beginning of the superimposition of said exposed image-receiving area and said second film, switch 68 is closed, causing nozzle 34 to be moved to the right and causing valve 36 to be opened. By means of the above described reciprocating mechanism, an even supply of processing liquid is fed into portions of first and second films in the entrance to the pressure region between said pressure-applying members, and an even layer of liquid processing composition is caused to be formed between said first and second films. After a predetermined processing time, during which a visible image is formed in an image-receiving area of the second film, said image-receiving area of said second film may be separated from the remainder of said first and second films.

Figure 2:
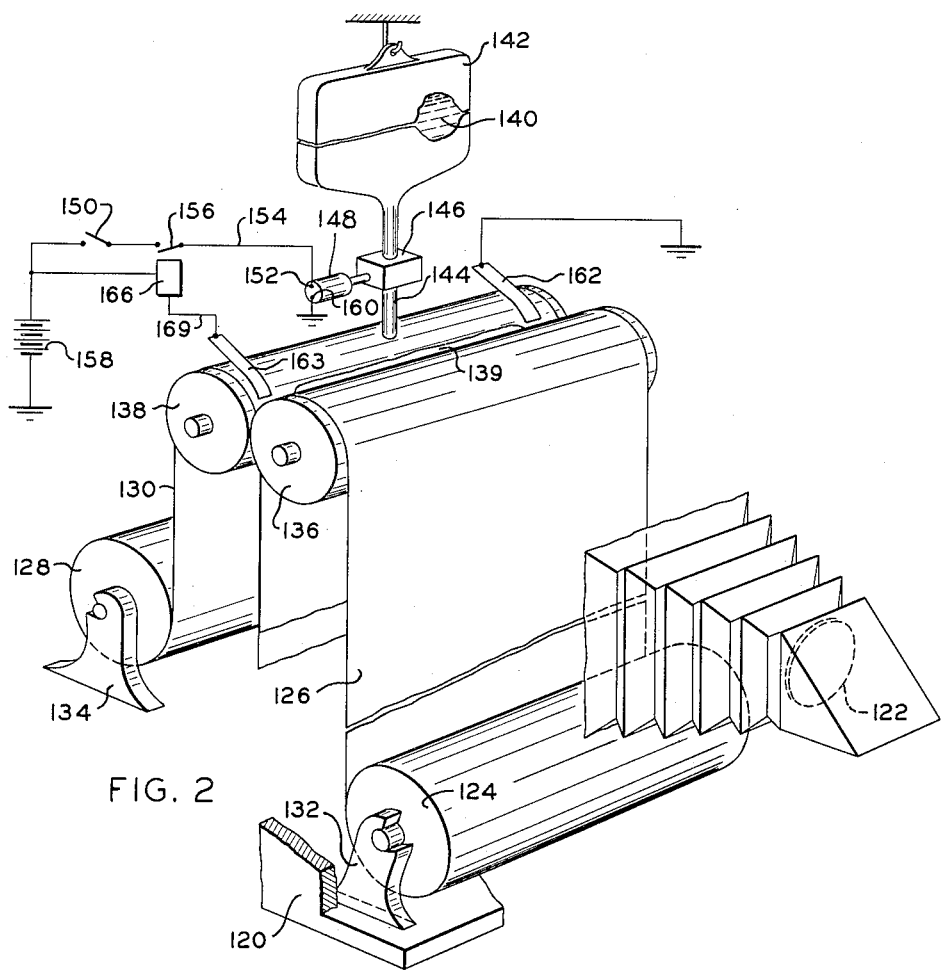
Fig. 2 is a diagrammatic, fragmentary, perspective view of another preferred embodiment of the present invention.
Figure 3:
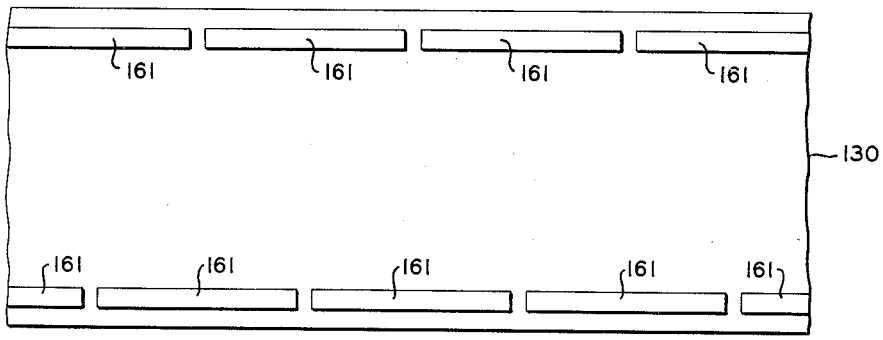
Fig. 3 is a fragmentary plan view of a film adapted for use in the embodiment of the present invention shown in Fig. 2.

Referring now to Fig. 2, there is shown a fragmentary, diagrammatic, perspective view of another preferred form of the present invention which is embodied in a photocopy camera. Like the embodiment of Fig. 1, the camera of Fig. 2 is provided with a pair of pressure-applying members which provide a pressure region between their adjacent surfaces. Said pressure region is adapted to movably receive in superposed relation portions of said first and second films with a thin layer of liquid processing composition therebetween, said portions before moving into said pressure region being adapted to hold a mass of liquid processing composition. In the camera of Fig. 2 a stationary discharge means is provided which is controlled by an electrical circuit which includes terminals that are preferably positioned at opposite edges of the second film. Said opposite edges preferably are provided with a series of media extending along each edge of the second film and which are adapted to be placed in contact with said terminals. Said series of media may comprise strips of aluminum or other metal foil, colloidal graphite, metallic film deposited by various evaporation methods, conducting ink, etc. A fragmentary plan view of one example of such a second film is shown in Fig. 3. The processing liquid is electrically conducting and, by making and breaking electrical connection between the conducting strips at opposite edges of said second film, said processing liquid controls the flow from the discharge means.

The photocopy camera of Fig. 2 comprises a housing 120 which mounts a lens, shutter assembly and bellows schematically indicated at 122. Rotatably mounted within housing 120 is roll 124 which comprises a first film of photosensitive material 126 that is adapted to be positioned by suitable guide surfaces and exposed in the focal surface of lens 122. First film 126 preferably comprises a silver halide layer. Also mounted within housing 120 is roll 128 which comprises second film 130 that is preferably adapted to receive a positive visible image which corresponds to the latent negative image formed by exposure of said first sheet 126. Second film 130 may comprise a silver precipitating layer having precipitating nuclei of the group consisting of the heavy metal sulfides and heavy metal selenides. It is to be expressly understood, however, that second film 130 may comprise a silver precipitating layer comprising any of the chemical compositions disclosed in my patents, patent applications and publication referred to above. Roll 124 is trunnioned on brackets 132 and roll 128 is trunnioned on brackets 134, one bracket 132 and one bracket 134 being shown in Fig. 2.

Pressure-applying members, such as rollers 136 and 138, suitably mounted in housing 120, are adapted to exert pressure on opposite sides of first and second films 126, 130 that have been superposed and are being drawn between said pressure-applying members. As in the case of the embodiment of Fig. 1, the pressure-applying members may comprise elements other than rollers. For example, both of the pressure-applying members may comprise flat or curved plates or, alternatively, one of the pressure-applying members may comprise a plate and the other a roller. Adjacent surfaces of pressure-applying members 136, 138 are spaced apart a distance slightly greater than the combined thickness of said first and second films to provide a pressure region through which said first and second films may be moved in superposed relation with a thin layer of liquid processing composition spread therebetween. First film 126, in operation, extends from roll 124 into the focal surface of lens 122 and into the V-shaped entrance to the pressure region between the adjacent surfaces of said pressure-applying members 136, 138. Second film 130 extends from roll 128 and into said V-shaped entrance. Said first and second films thence converge into said pressure region between said pressure-applying members. The portions of said first and second films which are positioned in the entrance to the pressure region between said pressure-applying members, or, as may be otherwise stated, which are approaching closely to said pressure region, are adapted to hold a mass 139 of liquid processing composition 140 from which is supplied the thin layer of liquid processing composition being formed between said films in said pressure region. Pressure-applying members 136, 138 may be suitably driven as by a hand crank or a motor (not shown).

At 142 is indicated a container which is adapted to hold a supply of liquid processing composition 140. Discharge means, such as nozzle 144, extends from container 142 and is adapted to eject a supply of liquid processing composition onto portions of said first and second films in the entrance to the pressure region between said pressure-applying members to form on said portions the aforementioned mass 139 of liquid processing composition 140. Liquid processing composition 140 is adapted to flow from container 142 through nozzle 144 to mass 139, the flow of liquid processing composition being controlled by valve 146 which is operatively connected to nozzle 144.

Before an exposed image-receiving area of first film 126 is drawn between pressure-applying members 136, 138 into superposition with the corresponding image-receiving area of second film 130 with a thin layer of liquid processing composition spread between said films, valve 146 may be opened to permit flow of liquid processing composition 140 onto portions of first and second films positioned in the entrance to the pressure region between said pressure-applying members to form mass 139. Valve 146 is controlled by solenoid 148 which forms part of a novel electrical control circuit which, in response to the volume of mass 139 of liquid processing composition, energizes or deenergizes said solenoid 148.

The flow of liquid processing composition through valve 146 may be initiated by manual closing of switch 150 which actuates solenoid 148 to open valve 146 and, additionally, places the aforementioned electrical control circuit in operation. Terminal 152 of solenoid 148 is connected by lead 154 through switch 156, which is normally closed, and manually operable switch 150 to power supply 158. Terminal 160 of solenoid 148 is connected to ground. When switch 150 is closed by an operator, current flows from power supply 158 through lead 154 and through solenoid 148 to ground. When solenoid 148 is thus actuated, valve 146 is opened and the liquid processing composition flows from container 142 through nozzle 144 to the mass 139 of liquid processing composition.

In order to prevent mass 139 of liquid processing composition from becoming greater in volume than a predetermined amount, in the present embodiment, each edge of second film 130 is provided with a series of strips of conducting material 161 (Fig. 3). As stated above, these strips may be composed of aluminum foil, colloidal graphite, metallic film deposited by various evaporation methods, conducting ink, etc. Strips 161 and a pair of terminals, such as brushes 162 and 163 (Fig. 2), constitute parts of the aforementioned electrical control circuit which energizes solenoid 148 to open valve 146 when the mass 139 of liquid processing composition is less in volume than a predetermined amount and which deenergizes solenoid 148 when the mass 139 is greater in volume than said predetermined amount. Brush 162 rides on one edge of second film 130 in contact with one series of conducting strips 161 and brush 163 rides on the other edge of second film 130 in contact with the other series of conducting strips 161. Brush 163 is connected by lead 164 through solenoid 166 to power supply 158. Brush 162 is connected to ground. When the mass 139 of liquid processing composition extends uninterruptedly from a strip 161 that is contacted by brush 162 to a strip 161 that is contacted by brush 163, current flows from power supply 158, through solenoid 166, brush 163, mass 139 and brush 162 to ground. The aforementioned electrical control means thus is responsive to the making and breaking of electrical connection between brushes 162, 163 by mass 139 of electrically conducting liquid processing composition. When solenoid 166 is actuated, switch 156 is opened, solenoid 148 is disconnected from power supply 158 and valve 146 is closed. When properly adjusted, the above circuit produces a flow of liquid processing composition sufficient to maintain said mass 139 at a predetermined volume, the processing liquid 140 being removed from said mass at the same rate as it is being supplied thereto.

A fragmentary plan view of second film 130 is shown in Fig. 3. A series of strips 161, rather than a single uninterrupted strip, is positioned along each edge of said second film to prevent closing of the circuit between the two edges of second film 130 at a location other than in the entrance to the pressure region between said pressure-applying members. It is to be understood that either one or both of the first and second films may be provided with strips of conducting ink. For example, the first film of photosensitive material 126 may be provided with strips similar to those shown in Fig. 3 and brushes 162, 163 may be arranged to ride on opposite edges of said first film 126. Also, where the liquid processing composition is a poor conductor and where a thin film of said liquid processing composition that extends from one edge to the other between said superposed films has high resistance, the strips along the edges of either said first or second film may be continuous.

In the operation of the photocopy camera of Fig. 2, roll 124 is positioned on brackets 132 and roll 128 is positioned on brackets 134. First film 126 is drawn from roll 124 into the focal surface of lens 122 and into contact with pressure-applying member 136. Second film 130 is drawn from roll 128 into contact with pressure-applying member 138. The first and second films thence are superposed between said pressure-applying members 136, 138, thus moving said exposed image-receiving area of first film 126 from exposure position into superposition with second film 130. Coincidentally with the beginning of the superimposition of said exposed image-receiving area and said second film, switch 150 is closed, whereby current flows from power supply 158 through switch 150 and switch 156 (switch 156 being normally closed), through solenoid 148 to ground, whereby valve 146 is opened. If the volume of mass 139 becomes greater than a predetermined amount, electrical contact is made between brushes 162 and 163 and current flows from power supply 158 through solenoid 166, brush 163, mass 139 and brush 162 to ground, whereby switch 156 is opened and valve 146 is closed. By means of the above-described electrical control circuit, an even supply of liquid processing composition is fed between first and second films 126, 130 that are being superposed in said pressure region and escape of the liquid processing composition beyond the ends of the entrance to said pressure region is prevented.

In the above-described embodiments of the present invention, the pressure-applying members may be driven by means of a hand crank or motor, or merely by manual grasping of the free ends of at least one of the first and second films. It is to be understood, however, that the rotation of the pressure-applying members may be synchronized with the flow of liquid processing composition so that the discharge means closes automatically after a predetermined length of sheet material has passed between said pressure-applying members.

The invention herein disclosed is not limited to use in a camera or other photographic device which effects exposure of a photosensitive film but may be advantageously used in other devices wherein a controlled supply of processing composition is desirable for processing a previously exposed film. Examples of such other devices are document copying apparatus, X-ray processing devices, etc.

Since certain changes may be made in the above apparatus and product without departing from the scope of the invention herein involved, it is intended that all matter contained in the above description or shown in the accompanying drawings shall be interpreted as illustrative and not in a limiting sense.

What is claimed is:

1. A photographic apparatus comprising a first mounting means for a supply of photosensitive film, a second mounting means for a supply of another film, a pair of pressure-applying members, means providing a pair of paths through which said photosensitive film and said other film are adapted to advance from said first mounting means and said second mounting means, respectively, into superposed relation between said pressure-applying members, a container for an electrically conducting processing composition, a discharge means communicating with said container and with a region of at least one path of said pair for enabling the flow of processing composition from said container to a portion of one of said films positioned in said region, said discharge means including a valve, and an electrical circuit operatively connected to said valve, said electrical circuit including a pair of terminals at least one of which is adjacent to said region, said electrical circuit acting to cause said valve to decrease and increase said flow in response to the making and the breaking, respectively, of electrical connection between said terminals, the processing composition on said portion being adapted to make said electrical connection when present on said portion in more than a predetermined quantity and to break said electrical connection when present on said portion in less than said predetermined quantity.

2. A photographic apparatus comprising a first mounting means for a supply of photosensitive film, a second mounting means for a supply of another film, a pair of pressure-applying members, means providing a pair of paths through which said photosensitive film and said other film are adapted to advance from said first mounting means and said second mounting means, respectively, into superposed relation between said pressure-applying members, a container for an electrically conducting processing composition, a discharge means communicating with said container and with a region of at least one path of said pair for enabling the flow of processing composition from said container to a portion of one of said films positioned in said region, said discharge means including a valve, and an electrical circuit operatively connected to said valve, said electrical circuit including a pair of terminals adjacent to said region, said electrical circuit acting to cause said valve to open and close in response to the making and the breaking, respectively, of electrical connection between said terminals, the processing composition on said portion being adapted to make said electrical connection when present on said portion in more than a predetermined quantity and to break said electrical connection when present on said portion in less than said predetermined quantity.

3. A photographic apparatus comprising a first mounting means for a supply of photosensitive film, a second mounting means for a supply of another film, a pair of pressure-applying members, means providing a pair of paths through which said photosensitive film and said other film are adapted to advance from said first mounting means and said second mounting means, respectively, into superposed relation between said pressure-applying members, a container for an electrically conducting processing composition, an elongated discharge means one end of which communicates with said container and the other end of which communicates with a region of at least one path of said pair for enabling the flow of processing composition from said container to a portion of one of said films positioned in said region, said region being adjacent to said pair of pressure-applying members, said discharge means including a valve, and an electrical circuit operatively connected to said valve, said electrical circuit including a pair of brushes adjacent to and at opposite edges of said region and adapted to ride on the opposite edges of said portion of said one of said films, said electrical circuit acting to cause said valve to decrease and increase said flow in response to the making and breaking, respectively, of electrical connection between said terminals, the processing composition on said portion being adapted to make said electrical connection when present on said portion in more than a predetermined quantity and to break said electrical connection when present on said portion in less than said predetermined quantity.

4. A photographic apparatus comprising a first mounting means for a supply of photosensitive film, a second mounting means for a supply of another film, a pair of pressure-applying members, means providing a pair of paths through which said photosensitive film and said other film are adapted to advance from said first mounting means and said second mounting means, respectively, into superposed relation between said pressure-applying members, a container for an electrically conducting processing composition, an elongated discharge means one end of which communicates with said container and the other end of which communicates with a region of at least one path of said pair for enabling the flow of processing composition from said container to a portion of one of said films positioned in said region, said region being adjacent to said pair of pressure-applying members, said discharge means including a valve, and an electrical circuit operatively connected to said valve, said electrical circuit including a pair of brushes adjacent to and at opposite edges of said region and adapted to ride on opposite edges of said portion of said one of said films, a solenoid having a core and a coil, said core being operatively connected to said valve in order to close said valve when said coil is deenergized and to open said valve when said coil is energized, said coil being serially connected between said terminals whereby said coil is energized when electrical connection is made between said terminals and is deenergized when electrical connection is broken between said terminals, the processing composition on said portion being adapted to make said electrical connection when present on said portion in more than a predetermined quantity and to break said electrical connection when present on said portion in less than said predetermined quantity.

5. A photographic apparatus comprising a mounting means for a supply of photographic film, a pair of pressure-applying members, means providing a path through which said photographic film is adapted to advance from said mounting means between said pressure-applying members, a container for an electrically conducting processing composition, a discharge means communicating with said container and with a region of said path for enabling the flow of processing composition from said container to a portion of said film positioned in said region, said discharge means including a valve, and an electrical circuit operatively connected to said valve, said electrical circuit including a pair of terminals adjacent to said region, said electrical circuit acting to cause said valve to decrease and increase said flow in response to the making and breaking, respectively, of electrical connection between said terminals, the processing composition on said portion being adapted to make said electrical connection when present on said portion in more than a predetermined quantity and to break said electrical connection when present on said portion in less than said predetermined quantity.

6. A photographic apparatus comprising a first mounting means for a supply of photosensitive film, a second mounting means for a supply of another film, a pair of pressure-applying members defining a pressure-applying region, means providing a pair of paths through which said photosensitive film and said other film are adapted to advance from said first mounting means and said second mounting means, respectively, into superposed relation within said pressure-applying region, a container for an electrically conducting processing composition, a discharge means communicating with said container and with said pressure-applying region for enabling the flow of processing composition from said container to the adjacent surfaces of portions of said films positioned within said pressure-applying region, said discharge means including a valve, and an electrical circuit operatively connected to said valve, said electrical circuit including a pair of terminals adjacent to said pressure-applying region, said electrical circuit acting to cause said valve to decrease and increase said flow in response to the making and breaking of electrical connection between said terminals, the processing composition on said portion being adapted to make said electrical connection when present on said portion in more than a predetermined quantity and to break said electrical connection when present on said portion in less than said predetermined quantity.

7. A photographic processing apparatus comprising a pair of pressure-applying rollers defining therebetween a bite through which a photographic film is adapted to advance, a container for an electrically conducting processing composition, a discharge nozzle one end of which communicates with said container and the other end of which is closely adjacent to said bite for enabling a flow of processing composition from said container to a surface of said portion, a valve for regulating said flow, an electrical circuit for controlling said valve in order to regulate said flow, said circuit including a pair of terminals at least one of which is closely adjacent to said bite and adapted to ride on said surface, said electrical circuit acting to cause said valve to respond to the making and breaking of electrical connection between said terminals, the processing composition on said surface being adapted to make said electrical connection when present on said surface in more than a predetermined quantity and to break said electrical connection when present on said surface in less than said predetermined quantity.

8. A photographic processing apparatus comprising a pair of pressure-applying rollers defining therebetween a bite through which associated portions of a photosensitive film and another film are adapted to advance into superposed relation, a container for an electrically conducting processing composition, a discharge nozzle one end of which communicates with said container and the other end of which is closely adjacent to said bite for enabling a flow of processing composition from said container to at least one of the adjacent surfaces of said associated portions, a valve for regulating said flow, an electrical circuit for controlling said valve in order to regulate said flow, said circuit including at least a pair of terminals at least one of which is closely adjacent to said bite and adapted to ride on at least one of said surfaces, said electrical circuit acting to cause said valve to respond to the making and breaking of electrical connection between said terminals, the processing composition on said one of said adjacent surfaces being adapted to make said electrical connection when present on said portion in more than a predetermined quantity and to break said electrical connection when present on said portion in less than said predetermined quantity.

9. A photographic processing apparatus comprising a pair of pressure-applying rollers defining therebetween a bite through which associated portions of a photosensitive film and another film are adapted to advance into superposed relation, a container for an electrically conducting processing composition, a discharge nozzle one end of which communicates with said container and the other end of which is closely adjacent to said bite for enabling a flow of processing composition from said container to the adjacent surfaces of said associated portions, a valve for regulating said flow, an electrical circuit for controlling said valve in order to regulate said flow, said circuit including at least a pair of terminals closely adjacent to said bite and adapted to ride on at least one of said surfaces, said electrical circuit acting to cause said valve to open and close in response to the making and breaking of electrical connection between said terminals, the accumulation of processing composition on said adjacent surfaces being adapted to make said electrical connection when present on said portion in more than a predetermined quantity and to break said electrical connection when present on said portion in less than said predetermined quantity.

10. A photographic film comprising a base having elongated edges, and a layer on one face of said base, said layer containing a heavy metal salt capable of being provided with a photographic silver image, said base and said layer being electrically non-conducting, and at least a series of discrete electrically conducting strips adjacent and parallel to one of said elongated edges of said film in end to end relation, the distances between adjacent ends of said strips being less than the lengths of said strips.

11. The photographic film of claim 10 wherein said layer contains silver halide.

12. The photographic film of claim 10 wherein said layer contains silver precipitating nuclei.

References Cited in the file of this patent

UNITED STATES PATENTS

| | | |
|---|---|---|
| 1,588,869 | Wolk | June 15, 1926 |
| 1,903,981 | Coffman | Apr. 18, 1933 |
| 1,963,096 | Petit et al. | June 19, 1934 |
| 2,248,293 | Woolf et al. | July 8, 1941 |
| 2,419,853 | Pask | Apr. 29, 1947 |
| 2,424,052 | Pratt et al. | July 15, 1947 |
| 2,563,343 | Land | Aug. 7, 1951 |